United States Patent
Ren et al.

(10) Patent No.: US 7,493,507 B2
(45) Date of Patent: Feb. 17, 2009

(54) SYSTEM FOR PROTECTING A MOTHERBOARD WHILE A COMPONENT IS NOT CONNECTED PROPERLY TO ITS POWER SOURCE

(75) Inventors: Ze-Shu Ren, Shenzhen (CN); Qi-Jie Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 392 days.

(21) Appl. No.: 11/308,750

(22) Filed: Apr. 28, 2006

(65) Prior Publication Data
US 2007/0157034 A1 Jul. 5, 2007

(30) Foreign Application Priority Data
Dec. 30, 2005 (CN) .......................... 200520121445.1

(51) Int. Cl.
G06F 1/00 (2006.01)
G06F 11/30 (2006.01)
(52) U.S. Cl. .................. 713/340; 713/300; 713/310
(58) Field of Classification Search .................. 713/300, 713/310, 340; 323/351
See application file for complete search history.

(56) References Cited

U.S. PATENT DOCUMENTS

| | | | |
|---|---|---|---|
| 6,275,949 B1 * | 8/2001 | Watanabe | 713/324 |
| 6,477,602 B1 * | 11/2002 | Loison | 710/301 |
| 6,687,837 B1 * | 2/2004 | Beck | 713/300 |
| 6,970,338 B2 | 11/2005 | Ju | |
| 7,278,042 B2 * | 10/2007 | Zhang | 713/340 |
| 2005/0114716 A1 * | 5/2005 | O | 713/300 |
| 2007/0153440 A1 * | 7/2007 | Huang | 361/91.1 |
| 2008/0151455 A1 * | 6/2008 | Ren | 361/89 |
| 2008/0158759 A1 * | 7/2008 | Liu | 361/92 |

* cited by examiner

*Primary Examiner*—Mark Connolly
(74) *Attorney, Agent, or Firm*—Wei Te Chung

(57) ABSTRACT

An assembly includes a circuit board (20) with a component attached thereon, a power supply (10) for providing power to the circuit board and the component separately, an ACPI chipset (65) for controlling the power supply, a protecting circuit (61) connected to the component, an I/O controller (64), and an enable circuit (62) for activating the I/O controller. The protecting circuit generates a protecting signal while the component is not connected properly to its power source. The I/O controller is responsive to the protecting signal to send a control signal to the ACPI chipset for shutting off the power supply.

8 Claims, 3 Drawing Sheets

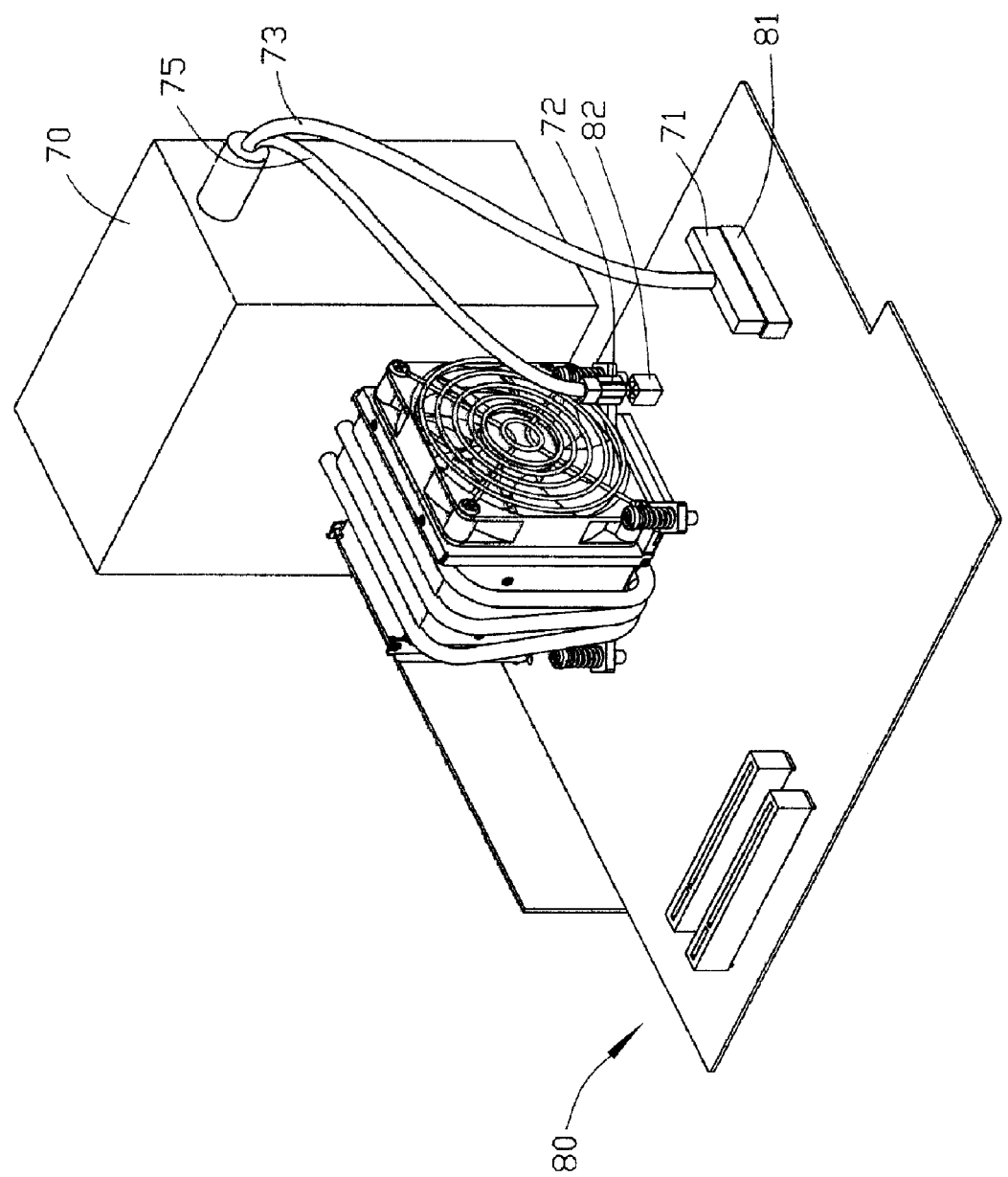
Fig. 3 <PRIOR ART>

SYSTEM FOR PROTECTING A MOTHERBOARD WHILE A COMPONENT IS NOT CONNECTED PROPERLY TO ITS POWER SOURCE

FIELD OF THE INVENTION

The present invention relates to a circuit, and more particularly to a circuit for protecting a computer motherboard from damage.

DESCRIPTION OF RELATED ART

Recent technical innovations have created faster central processing units (CPUs) for speeding up the data processing rate of a computer. However, the faster CPUs use much more power. The conventional motherboard cannot supply sufficient power to support the CPU, so the power supply needs to provide a special power cable for the CPU. At present, a graphics card on the motherboard also requires additional power directly from the power supply. In the future, more and more components on the motherboard will need to obtain power directly from the power supplies via special power cables.

As "Do It Yourself" computer assembly or reassembly becomes more and more popular, users will more often work with the motherboard themselves for removing or adding some components. For example, FIG. 3 illustrates this situation. A conventional power supply 70 is connected to a motherboard 80 via special cables 73, 75 extending from the power supply 70. More specifically, the motherboard 80 has a motherboard power receptacle 81 and a CPU power receptacle 82 mounted thereon for respectively receiving power from the power supply 70 and passing the power to the motherboard 80 and the CPU respectively. A motherboard power plug 71 electrically integrated with the cable 73 is detachably connected to the motherboard power receptacle 81. A CPU power plug 72 electrically integrated with the cable 75 is detachably connected to the CPU power receptacle 82. The motherboard power plug 71 is normally connected to the motherboard power receptacle 81, and the CPU power plug 72 is connected to the CPU power receptacle 82. In an assembly or a reassembly procedure, sometimes the users need to disconnect the motherboard power plug 71 and the CPU power plug 72 temporarily from the motherboard power receptacle 81 and the CPU power receptacle 82. However, the users may overlook the temporary disconnection of the CPU power plug 82 and the CPU power receptacle 72 as shown in FIG. 3, and forget to reconnect them during assembly. If the computer is powered on in this case, some components such as the CPU (not shown) on the motherboard may not operate properly, and there might even be damage to the components or the motherboard.

What is needed, therefore, is a circuit on a motherboard which can protect the motherboard and its components from damage in the above situation.

SUMMARY OF THE INVENTION

An assembly includes a circuit board with a component attached thereon, a power supply for providing power to the circuit board and the component separately, an advanced configuration and power interface (ACPI) chipset for controlling the power supply, a protecting circuit connected to the component, an input/output (I/O) controller, and an enable circuit for activating the I/O controller. The protecting circuit generates a protecting signal while the component is not connected properly to its power source. The I/O controller is responsive to the protecting signal to send a control signal to the ACPI chipset for shutting off the power supply.

Other advantages and novel features will be drawn from the following detailed description of a preferred embodiment with attached drawings, in which:

BRIEF DESCRIPTION OF DRAWINGS

FIG. 3 is a schematic view of a conventional motherboard connected to a power supply.

DETAILED DESCRIPTION

Figure 1:
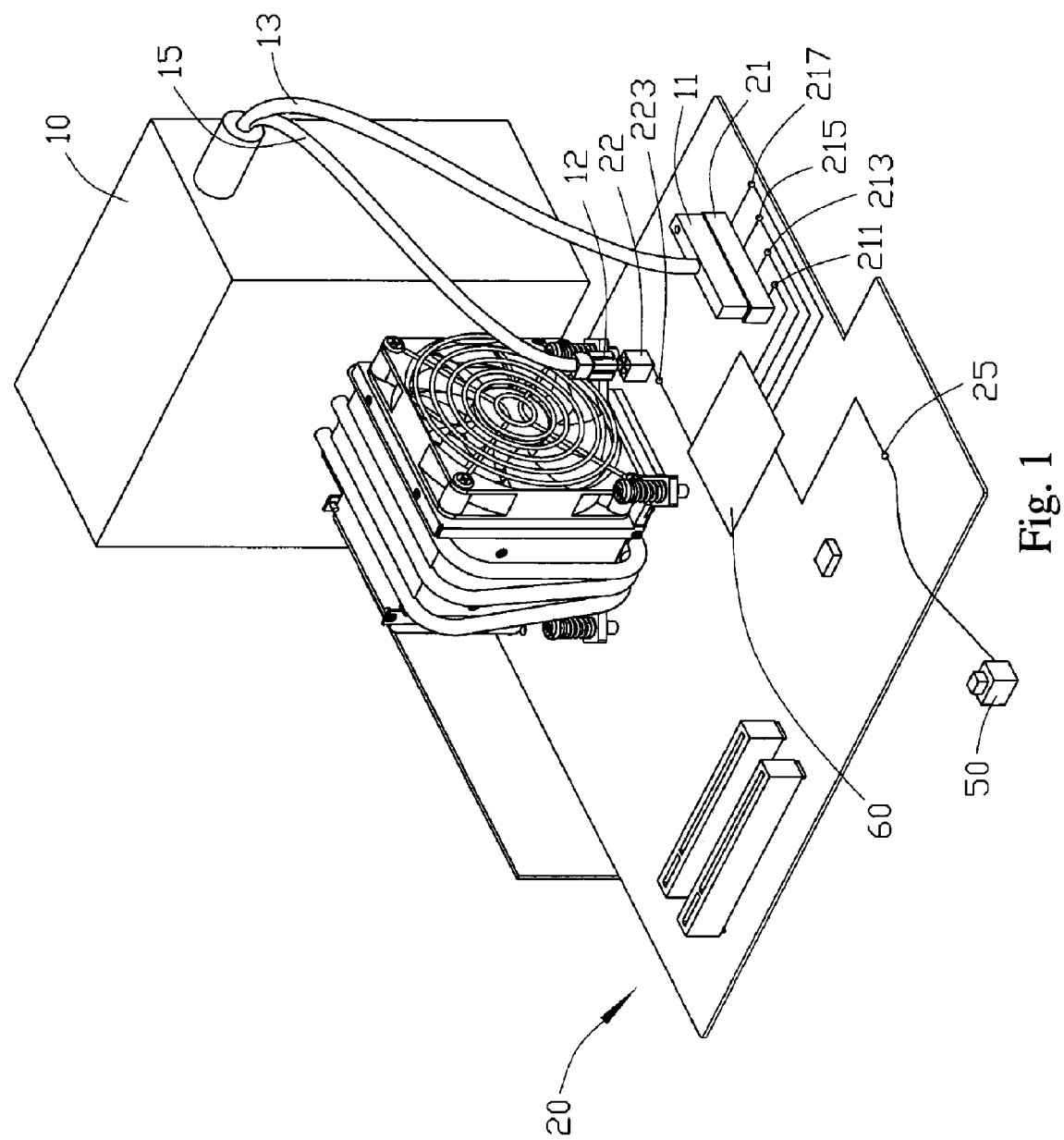
FIG. 1 is a schematic view of a motherboard with a circuit for protecting the motherboard.

Referring to FIG. 1, a circuit 60 for protecting a motherboard 20 in accordance with a preferred embodiment of the present invention is set on the motherboard 20.

A power supply 10 is connected to the motherboard 20 via a first cable 13 and a second cable 15 extending from the power supply 10. The motherboard 20 has a motherboard power receptacle 21 and a central processing unit (CPU) power receptacle 22 mounted thereon for respectively receiving power from the power supply 10 and passing the power to the motherboard 20 and the CPU respectively. A motherboard power plug 11 electrically integrated with the first cable 13 is detachably connected to the motherboard power receptacle 21. A CPU power plug 12 electrically integrated with the second cable 15 is detachably connected to the CPU power receptacle 22.

The motherboard power receptacle 21 includes pins 211, 213, 215, and 217. The pin 211 is used to transfer a PS-ON signal to the power supply 10. When the pin 211 is enabled at a low level and transfers a low level signal to the power supply 10, the power supply 10 provides power to the motherboard 20. When the pin 211 is enabled at a high level and transfers a high level signal to the power supply 10, the power supply 10 stops providing power to the motherboard 20. When the power supply 10 supplies correct power to the motherboard 20 and the CPU, the power supply 10 generates a PWROK signal (an assistant signal) and transfers it to the motherboard 20 via the pin 213 of the motherboard power receptacle 21. The pin 215 is enabled high by the power supply 10 at all times, even when the computer is shut off. The pin 217 is enabled high when the motherboard is powered on.

The CPU power receptacle 22 includes a pin 223. The pin 223 receives a component status signal that indicates a voltage of the CPU. When the CPU power-on voltage is normal, the pin 223 is enabled at a high level. When the CPU power-on voltage is abnormal, the pin 223 is enabled at a low level.

The motherboard 20 also includes a terminal 25 that is connected with a power button 50. The terminal 25 is used to power on or shut off the computer. The terminal 25 is at high level when in normal condition. When the power button 50 is pressed, an undershoot signal will be created at the terminal 25 for the circuit 60 to power on or shut off the computer.

As shown in FIG. 1, the motherboard power plug 11 is inserted into the motherboard power receptacle 21 for providing power to the motherboard 20, but the CPU power plug 12 is not inserted into the CPU power receptacle 22. In this case, the circuit 60 functions to protect the motherboard 10 from damage by stopping power to the motherboard 10.

Figure 2:
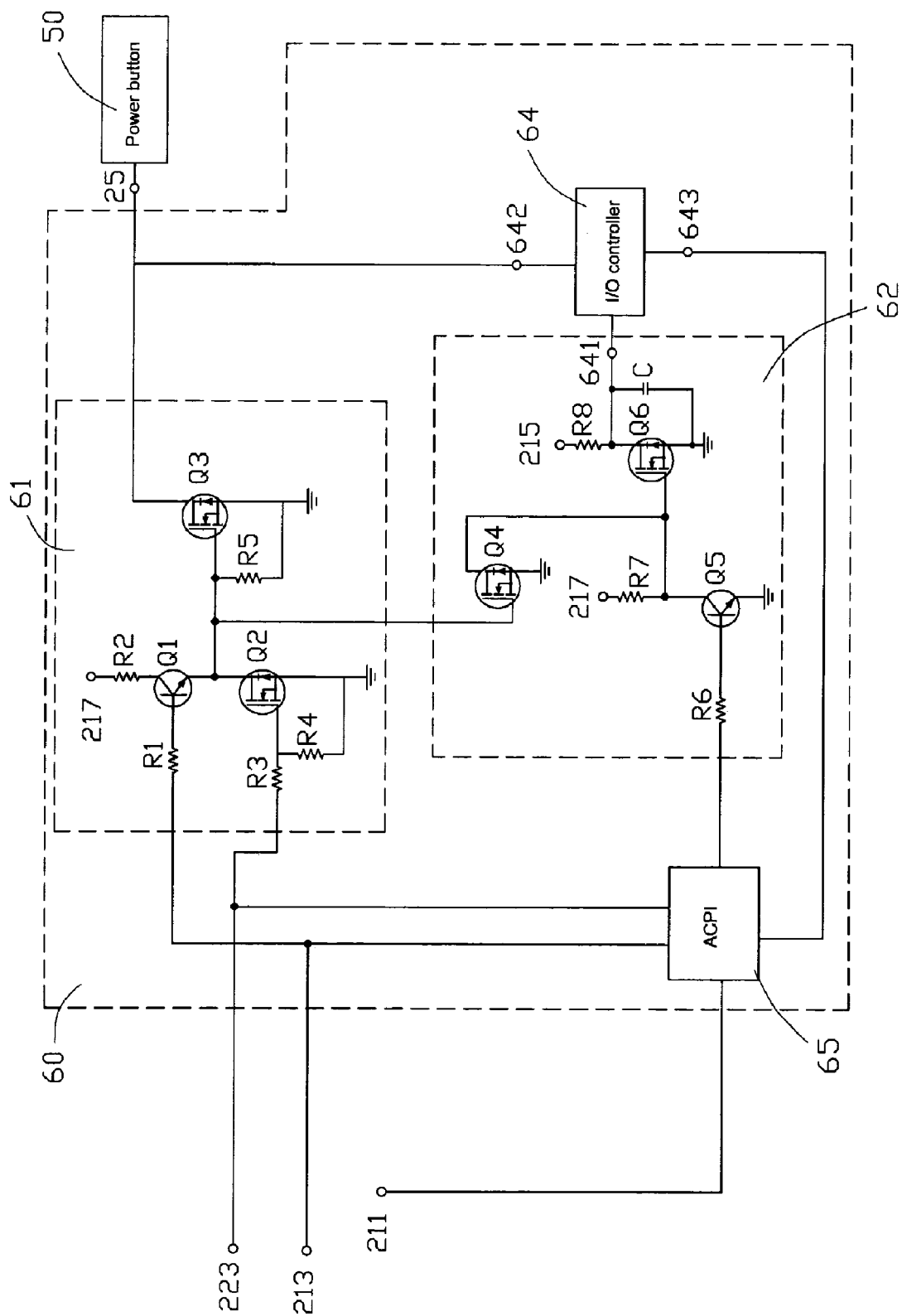
FIG. 2 is a schematic view of the circuit of FIG. 1 in accordance with a preferred embodiment of the present invention.

Referring to FIG. 2, the circuit 60 includes a protecting circuit 61, an enable circuit 62, an input/output (I/O) controller 64, and an advanced configuration and power interface (ACPI) chipset 65.

The protecting circuit 61 includes a first transistor Q1, a second transistor Q2, and a third transistor Q3. A base of the first transistor Q1 is connected to the pin 213 of the motherboard power receptacle 21 via a first resistor R1. A collector of the first transistor Q1 is connected to the pin 217 via a second resistor R2. An emitter of the first transistor Q1 is connected to a drain of the second transistor Q2. A gate of the second transistor Q2 is connected to the pin 223 of the CPU power receptacle 22 via a third resistor R3. A source of the second transistor Q2 is connected to a ground. A fourth resistor R4 interconnects the gate and the source of the second transistor Q2.

A gate of the third transistor Q3 is connected to a drain of the second transistor Q2. A source of the third transistor Q3 is connected to the ground. A fifth resistor R5 interconnects the gate and the source of the third transistor Q3. A drain of the third transistor Q3 is connected to the terminal 25 to transmit a protecting signal to the terminal 25.

The enable circuit 62 includes a fourth transistor Q4, a fifth transistor Q5, and a sixth transistor Q6. A base of the fourth transistor Q4 is connected to the drain of the second transistor Q2. A source of the fourth transistor Q4 is connected to the ground. A drain of the fourth resistor Q4 is connected to a collector of the fifth transistor Q5 which is connected to the pin 217 via a resistor R7. An emitter of the fifth transistor Q5 is connected to the ground.

A gate of the sixth transistor Q6 is connected to a collector of the fifth transistor Q5. A drain of the sixth transistor Q6 is connected to the pin 215 via an eighth resistor R8. A capacitor C interconnects the drain and the source of the sixth transistor Q6. The drain of the sixth transistor Q6 is connected to a control terminal 641 of the I/O controller 64 to transmit an enable signal to the I/O controller 64 for controlling the I/O controller 64 to work or not. An input terminal 642 of the I/O controller 64 is connected to the terminal 25. An output terminal 643 of the I/O controller 64 is connected to the ACPI chipset 65.

The ACPI chipset 65 is connected to the pin 211 for transmitting the PS-ON signal to the power supply 10. The pin 213 is connected to the ACPI chipset 65 and a base of the first transistor Q1 for providing the PWROK signal to them.

The pin 223 is connected to a base of the second transistor Q2 and the ACPI chipset 65 for transmitting the component status signal to them.

Described below is a working principle of the circuit.

The power button 50 is pressed. An undershoot signal is sent from the terminal 25 to the I/O controller 64 of the circuit 60. Because the transistor Q6 is switched off, the control terminal 641 connected to the pin 25 is enabled at a high level to have the I/O controller 64 working. The I/O controller 64 outputs a control signal to the ACPI chipset 65 to have the ACPI chipset 65 send the PSON signal to the power supply 10 via the pin 211. The power supply 10 provides power to the computer system. The pin 217 is enabled high. The high level PWROK signal is created on the pin 213, and is transmitted to the ACPI chipset 65 and a base of the first transistor Q1.

Then, if the CPU power-on voltage is abnormal, the following occurs. The pin 223 connected to the gate of the second transistor Q2 is enabled at a low level, and the second transistor Q2 is switched off. The first transistor Q1 is switched on by the high level PWROK signal. The emitter of the first transistor Q1 outputs a high level signal to the gates of the third transistor Q3 and the fourth transistor Q4. The third transistor Q3 and the fourth transistor Q4 are switched on. The drain of the third transistor Q3 outputs an undershoot signal to the input terminal 642 of the I/O controller 64.

The gate of the sixth transistor Q6 is enabled at a low level because of conduction of the fourth transistor Q4. The sixth transistor Q6 is switched off. The control terminal 641 of the I/O controller 64 is enabled at a high level to keep the I/O controller 64 working. The I/O controller 64 outputs a control signal to the ACPI chipset 65. The ACPI chipset 65 sends a signal to the power supply via the pin 211 to have the power supply 10 stop providing power to the computer system. The computer system is shut down.

If the CPU power-on voltage signal is normal, the following occurs. The pin 223 is enabled at a high level. The ACPI chipset 65 receives high-level signals from the pins 211 and 213 simultaneously, and sends a high-level signal to the base of the fifth transistor Q5. The fifth transistor Q5 is switched on, and the gate of the sixth transistor Q6 is enabled at a low level because of conduction of the fifth transistor Q5. The control terminal 641 of the I/O controller 64 is enabled high to keep the I/O controller 64 working. The second transistor Q2 is switched on due to the connection between the gate of the second transistor Q2 and the high level pin 223. The drain of the second transistor Q2 is connected to the ground. The gate of the third transistor Q3 is enabled at a low level, and the third transistor Q3 is switched off. The signal sent to the input terminal 642 of the I/O controller is not changed. The power supply 10 continues providing power to the computer system.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An assembly comprising:
a circuit board with a component attached thereon;
a power supply for providing power to the circuit board and the component separately;
an ACPI chipset for controlling the power supply;
a protecting circuit connected to the component, and generating a protecting signal while the component is not connected properly to its power source;
an I/O controller responsive to the protecting signal to send a control signal to the ACPI chipset for shutting off the power supply; and
an enable circuit connected to the I/O controller, and transmitting an enable signal to activate the I/O controller.

2. The assembly as described in claim 1, wherein the protecting signal is an undershoot signal that causes the power supply to turn on or off.

3. The assembly as described in claim 1, wherein the I/O controller has a controller terminal connected to the enable circuit, an input terminal receiving the protecting signal, and an output terminal connected to the ACPI chipset.

4. The assembly as described in claim 1, wherein the component transmits a component status signal to the protecting circuit.

5. The assembly as described in claim 4, wherein the power supply transmits an assistant signal to both the ACPI chipset and the protecting circuit while the power supply is providing correct power.

6. The assembly as described in claim 5, wherein the protecting circuit comprises a first transistor, a second transistor, and a third transistor, the assistant signal is transmitted to a base of the first transistor for the first transistor to conduct, a collector of the first transistor receives a high level voltage, an emitter of the first transistor is connected to a gate of the third transistor and a drain of the second transistor, and while the component is not connected properly to the power supply, the component status signal is at a low level and is transmitted to a gate of the second transistor to switch off the second transistor, the gate of the third transistor is enabled at a high level and so the third transistor conducts to generate the protecting signal at a drain of the third transistor.

7. The assembly as described in claim 6, wherein the enable circuit comprises a fourth transistor, a fifth transistor, and a sixth transistor, a gate of the sixth transistor receives a high level voltage, and is connected to a drain of the fourth transistor and a collector of the fifth transistor, a drain of the sixth transistor is connected to a high level voltage and the I/O controller, a gate of the fourth transistor is connected to the drain of the second transistor, a base of the fifth transistor is connected to the ACPI chipset.

8. The assembly as described in claim 1, wherein the circuit board is a motherboard, and the component is a central processing unit.

* * * * *